United States Patent
Alkhamis

[11] Patent Number: 6,009,707
[45] Date of Patent: Jan. 4, 2000

[54] BUOYANCY DRIVEN ENERGY PRODUCING DEVICE

[76] Inventor: Mohammed Alkhamis, P.O. Box 85069, Riyadh 11691, Saudi Arabia

[21] Appl. No.: 09/010,036

[22] Filed: Jan. 21, 1998

[51] Int. Cl.[7] .................................................. F16D 31/02
[52] U.S. Cl. ............................... 60/398; 60/496; 60/507; 60/639
[58] Field of Search .............................. 60/398, 495, 496, 60/507, 639, 675

[56] References Cited

U.S. PATENT DOCUMENTS

| | | | |
|---|---|---|---|
| 3,934,964 | 1/1976 | Diamond | 60/495 X |
| 3,953,971 | 5/1976 | Parker | 60/675 X |
| 4,326,132 | 4/1982 | Bokel | 60/496 X |
| 4,498,294 | 2/1985 | Everett | 60/495 |
| 4,715,182 | 12/1987 | Adams | 60/495 |
| 5,430,333 | 7/1995 | Binford et al. | 290/54 |
| 5,873,249 | 2/1999 | Alkhamis | 60/639 |

FOREIGN PATENT DOCUMENTS

| 9506 | 7/1987 | United Kingdom | 60/675 |
|---|---|---|---|

*Primary Examiner*—Hoang Nguyen
*Attorney, Agent, or Firm*—Larson & Taylor

[57] ABSTRACT

An apparatus and method are provided for generating energy from a source of pressurized fluid by harnessing buoyancy and/or gravitational forces. The apparatus includes at least one container having an inlet port on a top side for receiving the pressurized fluid while the container is at the top of a tank or stand and an a drainage port on a bottom side for draining the pressurized fluid while the container is at the bottom of the tank or stand; a chain belt attached to the container such that the chain belt rotates as the container travels; and a shaft connected to the chain belt for producing rotational energy.

18 Claims, 4 Drawing Sheets

BUOYANCY DRIVEN ENERGY PRODUCING DEVICE

BACKGROUND OF THE INVENTION

1. Field of the Invention

The present invention relates to energy producing devices which use the buoyancy of containers in water, and, in particular, the rising and falling of such containers in water, to generate energy.

2. Related Art

The general concept of generating energy through the use of rising and falling movement of containers in water is disclosed, for example, in U.S. Pat. 5,430,333, to Binford et al. This patent discloses a system which uses inflatable containers attached to a looping belt. The containers are placed in a body of water. The containers on one side of the belt are filled with air and rise. The containers on the other side of the belt are deflated and sink. The resultant rotation of the belt, caused by the rising and sinking movement of the containers, can be used to drive a pump or bucket system or the like.

Prior art energy generating systems of this type require energy to fill and empty the containers. For example, the device disclosed in the Binford et al. patent requires the use of a compressor for this purpose. This disadvantage, among others, has limited the practical appeal of such systems.

SUMMARY OF THE INVENTION

According to the invention, an energy producing device is provided which produces energy by using rising and falling containers but which, among other advantages does not require the use of energy to fill and empty the containers.

In accordance with a first preferred embodiment of the invention, an apparatus for generating energy from a naturally occurring source of pressurized fluid, preferably water, by harnessing buoyancy and gravitational forces is provided. The apparatus includes: a tank filled with a fluid and having a top and a bottom; at least one container having an inlet port on a top side for receiving pressurized fluid when the container is at the top of the tank and a drainage port on a bottom side thereof for draining the pressurized fluid from the container when the container is at the bottom of the tank so that the container is caused to ascend, by buoyancy, to the top of the tank; a belt attached to the container and mounted for vertical movement such that the belt moves up and down as the container ascends and descends in the tank; a shaft connected to the belt so as to rotate in response to the up and down movement of the belt; and an energy takeoff means, driven by the shaft, for producing output energy.

In a preferred embodiment, the energy takeoff means includes: a hydraulic pump connected to the shaft; a turbine connected to the hydraulic pump; and a generator connected to the turbine for producing electrical energy.

In an alternative preferred embodiment, the energy takeoff means includes: a lifting unit driven by the shaft for lifting a weight from a first lower position to a second upper position; and a generator connected to the weight such that the generator produces electrical energy when the weight travels by gravity from the second position back toward the first position.

Advantageously, the apparatus further includes an air inlet port comprising: a tube extending within the container from the bottom side of the container to a portion substantially close to the top side of the container for permitting air flow into the container while the pressurized fluid is drained from the drainage port.

In a second preferred embodiment of the invention an apparatus for generating energy from a source of pressurized fluid, preferably water located at the top of a mountain, by harnessing buoyancy and gravitational forces is provided. The apparatus includes: at least a first energy producing unit and a second energy producing unit, each of the energy producing units includes: a tank filled with a fluid and having a top and a bottom; at least one container having an inlet port on a top side thereof for receiving pressurized fluid from a source when the at least one container is at the top of the tank and a drainage port on a bottom side thereof for draining the pressurized fluid from the at least one container when the at least one container is at the bottom of the tank so that the at least one container is caused to ascend, by buoyancy, to the top of the tank; a belt attached to the at least one container and mounted for vertical movement such that the belt moves up and down as the at least one container ascends and descends in the tank; and a shaft connected to the belt so as to rotate in response to the up and down movement of the belt. The apparatus for generating energy also includes an energy takeoff means, driven by the shaft, for producing output energy; and wherein the first energy producing unit is positioned above the second energy producing unit and the pressurized fluid drains from the drainage port in the at least one container in the first energy producing unit and fills the at least one container in the second energy producing unit through the inlet port.

In a preferred embodiment, the apparatus further includes: a boiler located at the bottom of the mountain for producing steam; an insulated pipe extending from the boiler to a turbine located at the top of the mountain for transporting the steam to the turbine; a generator connected to the turbine for producing electrical energy; and a condenser connected to the turbine for converting the steam to the pressurized fluid.

In a preferred embodiment, the energy takeoff means includes: hydraulic pumps connected to the shafts of the energy producing units; a hydraulic reservoir connected to the hydraulic pumps; a turbine connected to the hydraulic reservoir; and a generator connected to the turbine for producing electrical energy.

In an alternative preferred embodiment, the energy takeoff means includes: at least two lifting units driven by the shafts for lifting at least two weights at different times from a first lower position to a second upper position; and a generator connected to the weights such that the generator produces a continuous electrical energy output when the weights travel by gravity from the second position back toward the first position.

In another aspect of the invention, a method of generating energy from a naturally occurring source of pressurized fluid by harnessing buoyancy and gravitational forces is provided. The method includes the steps of filling a tank having a top and a bottom with a fluid; attaching a container to a chain belt within the tank; filing the container with pressurized fluid from a naturally occurring source, through an inlet port, while the container is at the top of the tank; mounting the chain belt for vertical movement within the tank; allowing the container to travel under the force of gravity to the bottom of the tank to cause movement of the chain belt; draining the pressurized fluid from the container, through a drainage port, while the container is at the bottom of the tank; allowing the container to travel to the top of the container, due to the buoyancy force on the container, to cause movement of the chain belt; and connecting a shaft to the chain belt so that the shaft is rotated by the movement of the chain belt to produce rotational energy.

Other features and advantages of the present invention are set forth in or apparent from the following detailed description of a preferred embodiment.

DESCRIPTION OF THE PREFERRED EMBODIMENT

Figure 1:
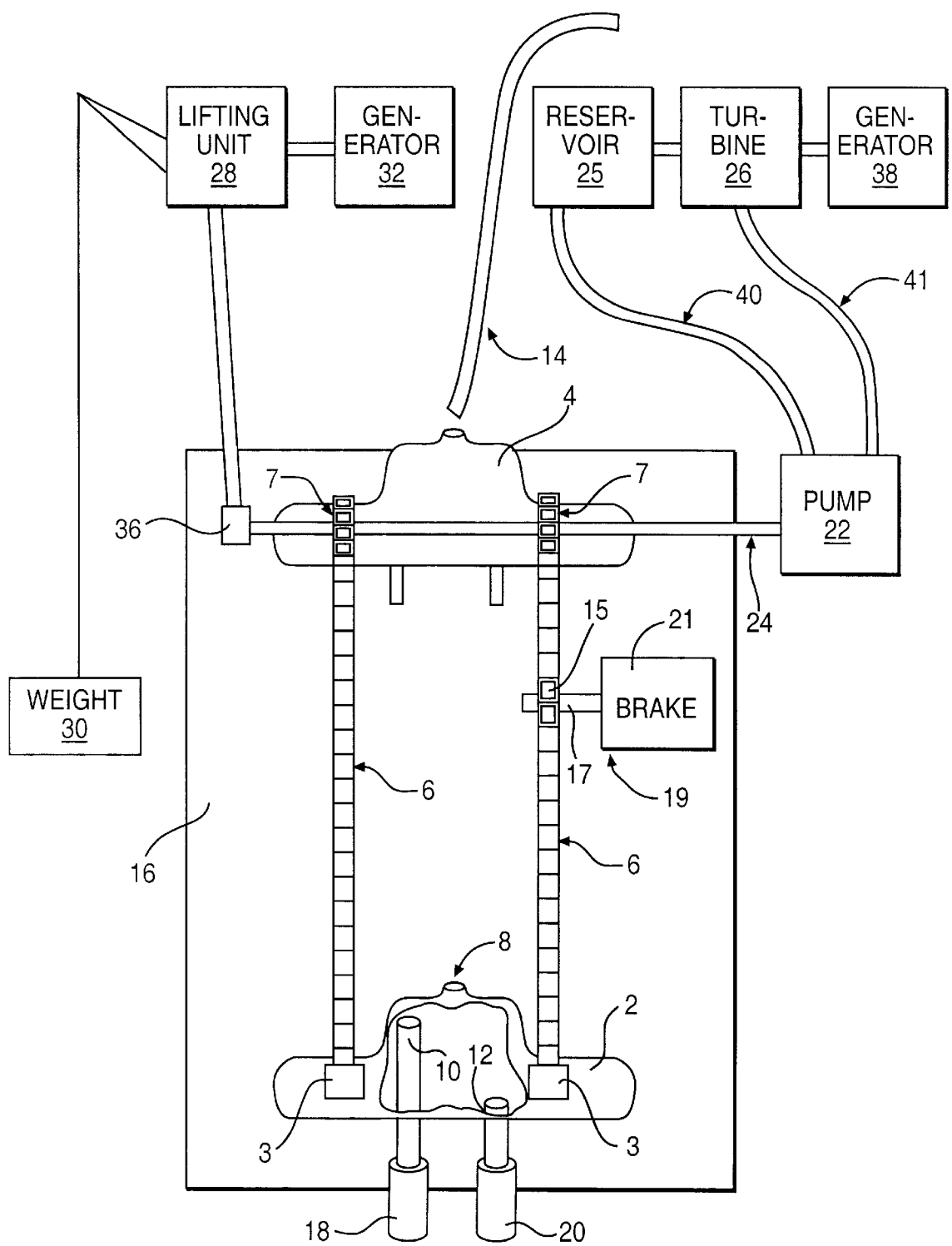
FIG. 1 is a schematic diagram of an energy producing device which includes a tank of water, in accordance with a first embodiment of the invention.

A first preferred embodiment of the energy producing device of the invention is shown in FIG. 1. In this embodiment, two tanks, denoted 2 and 4, are attached to opposite ends of two chain belts 6. In the illustrated embodiment, the chain belts 6 are shown as being connected at one end to one side of the tank 2 at weld spots indicated schematically at 3 although other methods of attachment can, of course, be used. The chain belts 6 loop over a drive shaft 24 and are in engagement with conventional one-way gear assemblies 7. The gear assemblies 7 have teeth inserted into the holes of the chain belts 6 and operate, in a conventional manner, so that up and down movement of the belts 6 cause rotation of drive shaft 24 in a single direction. The other ends of chain belts 6 are attached to tank 4 on the side of the tank not shown in FIG. 1. The device produces energy by harnessing the rising and falling motion of the tanks 2 and 4 within a container 16 filled with water. The container 16 is large and in an exemplary embodiment is 75 meters high. All metal materials are preferably stainless steel to avoid rusting.

For purposes of simplicity, tank 2 will be described in detail, with the understanding that tank 4 is similar. Tank 2 includes at the top thereof a water inlet 8 and at the bottom thereof, an air inlet pipe 10 and a water drainage pipe 12. It is preferred that the air inlet pipe 10 extend to the top of the container 2 to optimize the rate at which water is drained from the tank 2.

Although in FIG. 1 the tank 2 is shown at the bottom of the container 16, initially the tank 2 is at the top of the container 16. Water enters the inlet 8 through a fill pipe 14 located above container 16. It is preferred that the inlet 8 be constructed so as to open automatically when at the top of the container 16 (e.g., in response to the decreased pressure thereon when the inlet 8 is clear of the water) so as to facilitate filling the tank 2. The container 16 is preferably located in front of a dam on a river bank. The river supplies the energy necessary to move the water through the pipe 14.

A brake mechanism 19 includes a gear member 15. The teeth of the gear member 15 are inserted into the holes of one of the chain belts 6 while a shaft 17 connects the gear member 15 to a brake 21. The brake 21 stops the motion of the chain belts 6 by applying a frictional force to the shaft 17. The brake mechanism 19 holds the tanks 2 and 4 in place during filling and emptying. In an alternative embodiment, a similar brake mechanism is connected to shaft 24.

After the tank 2 is filled with water and the brake mechanism 19 is released, the tank descends to the bottom of the container 16, due to the force of gravity. A pair of spaced drainage pipes 18 and 20 are provided in the bottom of container 16 and when tank 2 reaches the bottom, the air inlet pipe 10 and the water drainage pipe 12 are received in and extend into drainage pipes 18 and 20, respectively.

Figure 1A:
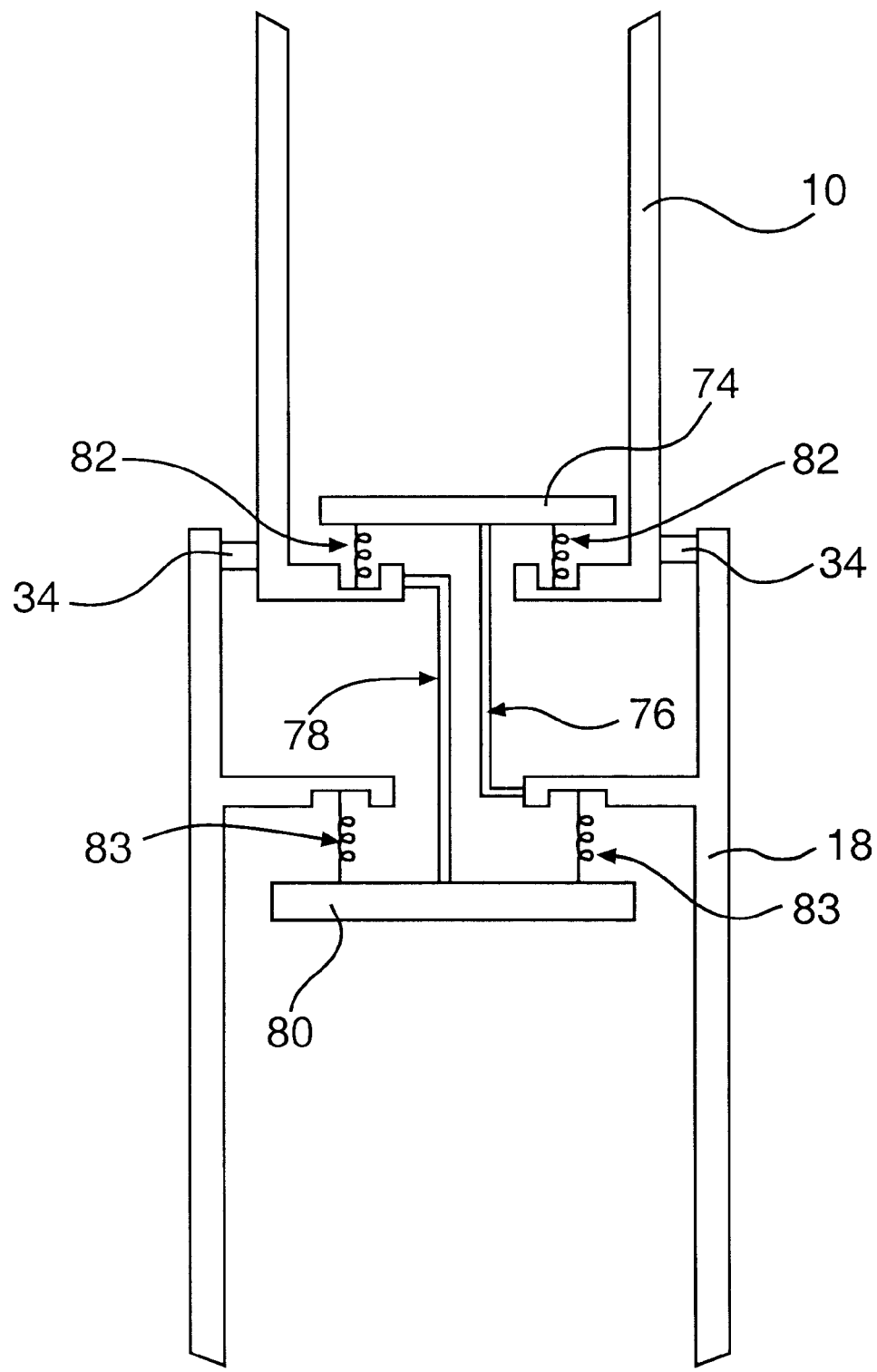
FIG. 1A is an enlarged cross sectional view of the air inlet pipe engaging the drainage pipe of FIG. 1.

FIG. 1A shows the air inlet pipe 10 partially inserted into the drainage pipe 18. The air inlet pipe 10 includes a push rod 78 attached to an end which inserts into the drainage pipe 18. A valve 74 is attached to the air inlet pipe 10 with springs 82. When the air inlet pipe 10 is not inserted into the drainage pipe 18, the valve 74 is closed and forms an air tight seal. However, when the air inlet pipe 10 is inserted into the drainage pipe 18, a push rod 76, attached to the drainage pipe 18 forces the springs 82 to expand and the valve 74 to open. A similar valve 80 is attached by springs 83 to drainage pipe 18 and in a similar manner, the push rod 78, attached to the air inlet pipe 10, forces springs 83 to expand and open valve 80. An air tight seal is thus formed between the air inlet pipe 10 and the water drainage pipe 12 with the aid of seal 34.

The water drainage pipe 12 and the drainage pipe 20 have a similar construction to that described above for pipes 10 and 18. Any valve arrangement or other structure can be used to keep the respective valves closed while the air inlet pipe 10 and the water drainage pipe 12 are not inserted into respective drainage pipes 18 and 20. In an alternative embodiment, a computer (not shown) is used to operate electric valves (not shown) in synchronism with the brake assembly 19.

When tank 2 is at the bottom of the container 16, tank 4 is at the top of the container 16. While tank 2 is at the bottom of the container 16, the brake mechanism 19 stops the chain belts 6 so that the tank 2 can drain. Air enters the air inlet pipe 10, while water drains through the water drainage pipe 12. Once the water is drained and the tank 2 is filled with air, the tank 2 rises to the top of the container 16. Tank 2 will rise because the combined weight of the tank 2 and the air inside of the tank are lighter than the weight of the water displaced by the tank 2.

The operation of tank 4 is, of course, similar to that of tank 2 but tank 4 rises when tank 2 descends and vice versa. As noted above, the rising and falling of tanks 2 and 4 cause the chain belts 6 to move up and down and to cause rotation of shaft 24. Because of the one-way gear assemblies 7, the rotation of shaft 24 is always in the same direction. The rotational movement of shaft 24 is harnessed to generate power. In one preferred embodiment shown in FIG. 1, a shaft 24 is connected to a hydraulic pump 22. The hydraulic pump 22 fills a reservoir 25 through a connecting pipe 40. The fluid in the reservoir 25 is extracted to drive a turbine 26, which in turn drives a generator 38. The fluid returns to the hydraulic pump 22 through a connecting pipe 41. In another embodiment also illustrated in FIG. 1, the shaft 24 is connected to a lifting unit 28 through a gearbox 36. The lifting unit raises a weight 30. In this embodiment, the kinetic energy of the chain belts 6 are transferred into the potential energy of the weight 30. A generator 32 is connected to the lifting unit 28 and the weight 30 such that the generator 32 produces energy when the weight 30 is lowered.

While the tanks 2 and 4 are refilling and draining, the tanks are stationary and thus the chain belts 6 do not move. The embodiments described above which use hydraulic pump 22 and/or the weight 30 transform the periodic output of the belts 6 into steady outputs. In another embodiment, two or more of the energy producing devices described above are connected to a common shaft to produce a more steady output.

It will be understood that the present invention is not limited to using a separate container 16. The elements shown in FIG. 1 can be attached to a stand or other support sunk into the bed of a deep lake or in an ocean. The device would operate in essentially the same manner as the first embodiment shown in FIG. 1. However, the draining operation would be different because of the water pressure at the bottom of the lake or ocean. The tanks 2 and 4 would be emptied by applying vacuum pressure to a drainage port at the bottom of the tanks. In one example, an electric pump is used to apply the vacuum pressure and the air inlet pipe 10 is connected to the atmosphere above the lake or ocean.

Figure 2:
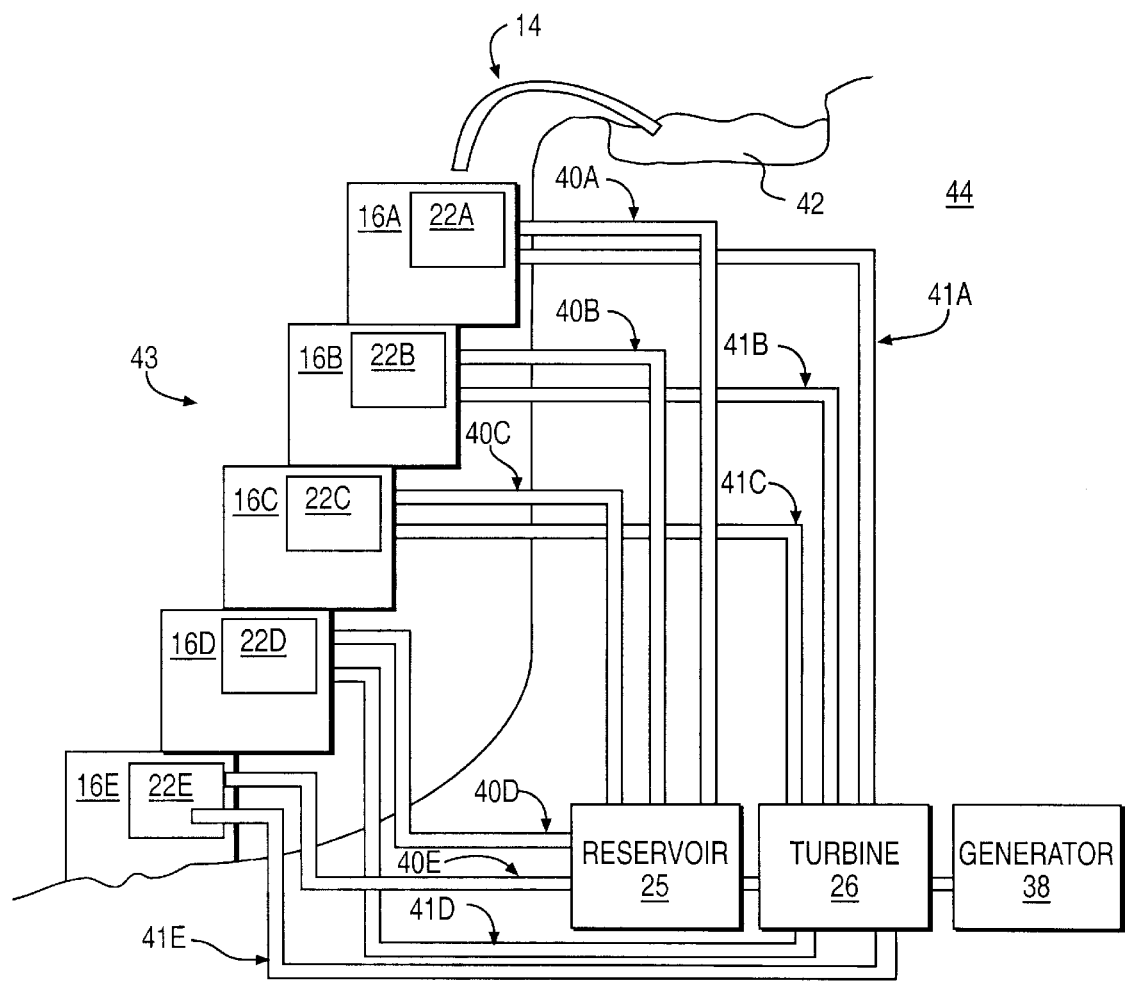
FIG. 2 is a schematic diagram of an energy producing device located next to a mountain with a natural source of water at the top of the mountain, in accordance with a second embodiment of the invention.

Referring to FIG. 2, there is shown a device generally denoted 43, constructed in accordance with a second embodiment of the invention. In FIG. 2, five separate containers 16A–16E, which are identical to the container 16, of FIG. 1, are arranged in a step-like configuration against a mountain 44. One advantage of the step-like configuration is that it facilitates maintenance of the containers 16A–16E. A natural water source 42 is shown on top of mountain 44 and the latter preferably has a height of at least 2000 meters. The natural water source 42 supplies water to the device 43 through a fill pipe 14.

Container 16A–16E include tanks corresponding to the tanks 2 and 4 shown in FIG. 1 and draining and filling of these tanks takes longer than the rising and falling motions. For the embodiment shown in FIG. 2, it is assumed that draining and filling takes 5 minutes and the rising and falling motions take 1 minute. With these assumptions, five containers 16A–16E are used to produce a steady output, as described below.

Containers 16A–16E also include a brake corresponding to the brake 21 shown in FIG. 1, the brake in container 16A is released first. The corresponding tanks 2 and 4 then rise and fall within container 16A. One minute later, the tanks 2 and 4 have completed their travel in the container 16A. While the lower tank of tanks 2 and 4 is draining into a reservoir (not shown), the brake is released in container 16B. The water drained from the tanks in container 16A is transferred through an intermediate reservoir (not shown) into the tanks in container 16B. The reservoir is needed because the tanks in container 16A take one minute to drain and fill while the tanks in container 16B are rising and falling. The water travels through the remaining containers 16C–16E in the same manner and the brakes in containers 16C, 16D and 16E are also released in successive one minute intervals. Therefore, there is always one container in which the tanks 2 and 4 are rising and falling, and this results in a steady output.

The movement of the tanks 2 and 4 within each container 16A–16E drives corresponding hydraulic pumps 22A–22E. In the particular preferred embodiment shown in FIG. 2, each of the hydraulic pumps 22A–22E fills a reservoir 25 through a respective connecting pipe 40A–40E. The fluid in the reservoir 25 is extracted to drive a turbine 26 which, in turn, drives a generator 38. The fluid returns to the hydraulic pumps 22A–22E through connecting pipes 41A–41E. The use of multiple containers 16A–16E ensures that there is a constant pressure applied to the reservoir 24.

While the number of containers used in the embodiment shown in FIG. 2 is five, the actual number of containers used is a function of the ratio of the draining and filling time to the rising and falling time. The number of containers is preferably chosen such that there is a constant pressure on the reservoir 25. In another embodiment multiple groups of containers are used. For example, the embodiment shown in FIG. 2 could use ten groups of five containers such that ten containers are always pressurizing the reservoir 25.

In another embodiment, the mechanical output of the containers 16A–16E is connected to at least two lifting units (not shown) through gearboxes (not shown), in manner similar to that shown in FIG. 1. The lifting units raise at least two weights so that there is always at least one weight being lowered to drive a generator.

One advantage of the embodiment of FIG. 2 (and the related embodiments) is that it can be used to transfer potable water from the top of a mountain to an urban environment located at the bottom of a mountain while also generating power.

Figure 3:
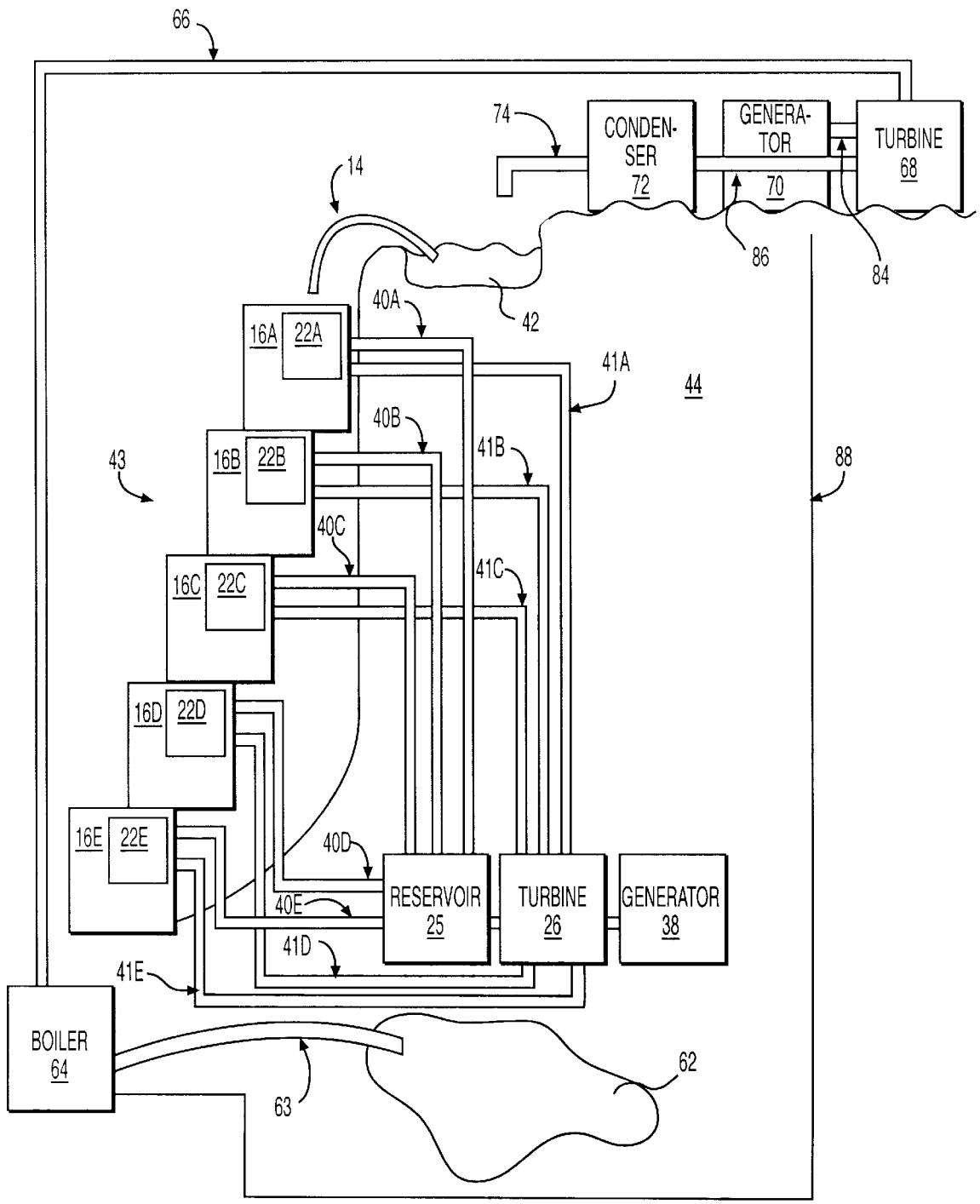
FIG. 3 is a schematic diagram of an energy producing device located next to a mountain with a source of water at the bottom of the mountain, in accordance with a third embodiment of the invention.

The device shown in FIG. 2 can also be used in places without a natural supply of water at the top of a mountain. FIG. 3 shows a third embodiment which uses a source of sea water 62 at the bottom of the mountain 44. The sea water 62 is supplied by a connecting hose or pipe 63 to a boiler 64 which produces steam. The resulting steam travels up an insulated pipe 66 to a turbine 68. The turbine 68 drives a generator 70 with a shaft 84. The output of the generator 70 travels through conductors 88 to help power the boiler 64. Steam leaving the turbine 68 passes through a pipe 86 to a condenser 72. The water leaving the condenser passes through another pipe 74 to the reservoir 42. The basic energy producing device 43 then operates in the same manner as the second embodiment shown in FIG. 2. In this embodiment, a predetermined quantity of water 62 can be repeatedly used by the device 43 so that no new water is needed.

Although the invention has been described in detail with respect to preferred embodiments thereof, it will be apparent to those skilled in the art that variations and modifications can be effected in these embodiments without departing from the spirit and scope of the invention.

I claim:

1. An apparatus for generating energy from a naturally occurring source of pressurized fluid by harnessing buoyancy and gravitational forces, said apparatus comprising:

a tank filled with a fluid and having a top and a bottom;

at least one container having an inlet port on a top side thereof for receiving pressurized fluid from a naturally occurring source outside of said tank, when said at least one container is at the top of said tank, a separate, drainage port on a bottom side thereof for draining said pressurized fluid from the at least one container when said at least one container is at the bottom of said tank so that the at least one container is caused to ascend, by buoyancy, to the top of the tank;

a belt attached to said at least one container and mounted for vertical movement such that said belt moves up and down as said at least one container ascends and descends in said tank;

a shaft connected to said belt so as to rotate in response to the up and down movement of said belt; and energy takeoff means, driven by said shaft, for producing output energy.

2. The apparatus according to claim 1, wherein said pressurized fluid is water.

3. The apparatus according to claim 1, wherein said energy takeoff means includes:

a hydraulic pump connected to said shaft;

a turbine connected to said hydraulic pump; and a generator connected to said turbine for producing electrical energy.

4. The apparatus according to claim 1, wherein said energy takeoff means comprises:

a lifting unit driven by said shaft for lifting a weight from a first lower position to a second upper position; and a generator connected to said weight such that said generator produces electrical energy when said weight travels by gravity from said second position back toward said first position.

5. The apparatus according to claim 1 further comprising an air inlet port on said bottom side of said at least one container for enabling injection of air into said at least one container.

6. An apparatus for generating energy from a source of pressurized fluid by harnessing buoyancy and gravitational forces, said apparatus comprising:

a plurality of energy producing units, each of said energy producing units comprises:

a tank filled with a fluid and having a top and a bottom;

at least one container having an inlet port on a top side thereof for receiving pressurized fluid from a source when said at least one container is at the top of said tank and a drainage port on a bottom side thereof for draining said pressurized fluid from the at least one container when said at least one container is at the bottom of said tank so that the at least one container is caused to ascend, by buoyancy, to the top of the tank;

a belt attached to said at least one container and mounted for vertical movement such that said belt moves up and down as said at least one container ascends and descends in said tank; and a shaft connected to said belt so as to rotate in response to the up and down movement of said belt; and an energy takeoff means, driven by said shaft, for producing output energy;

a first of said energy producing units being positioned above a second of said energy producing units such that pressurized fluid drains from the first energy producing unit into the said second energy producing unit.

7. The apparatus according to claim 6, wherein said pressurized fluid is water located at the top of a mountain.

8. The apparatus according to claim 7, further including:

a boiler located at said bottom of said mountain for producing steam;

an insulated pipe extending from said boiler to a turbine located at the top of said mountain for transporting said steam to said turbine;

a generator connected to said turbine for producing electrical energy; and a condenser connected to said turbine for converting said steam to said pressurized fluid.

9. The apparatus according to claim 6, wherein said energy takeoff means comprises:

hydraulic pumps connected to said shafts of said energy producing units;

a hydraulic reservoir connected to said hydraulic pumps;

a turbine connected to said hydraulic reservoir; and a generator connected to said turbine for producing electrical energy.

10. The apparatus according to claim 6, wherein said energy takeoff means comprises:

at least two lifting units driven by said shafts for lifting at least two weights at different times from a first lower position to a second upper position; and a generator connected to said weights such that said generator produces a continuous electrical energy output when said weights travel by gravity from said second position back toward said first position.

11. A method of generating energy from a naturally occurring source of pressurized fluid by harnessing buoyancy and gravitational forces on at least one container located within a tank and attached to a chain belt mounted for vertical movement, said method comprising the steps of:

filling a tank having a top and a bottom with a fluid;

filling at least one container located within said tank with pressurized fluid from a naturally occurring source located outside of the tank, through an inlet port, while said at least one container is at said top of said tank;

allowing said at least one container to travel under the force of gravity to said bottom of said tank to cause movement of a chain belt draining said pressurized fluid from said at least one container, through a separate drainage port, while said at least one container is at said bottom of said tank; and allowing said at least one container to travel to the top of said container, due to the buoyancy force on said container, to cause movement of said chain belt and a shaft connected to said chain belt.

12. A method as claimed in claim 11 further comprising filling said at least one container with air while said at least one container is at the bottom of said tank and while said at least one container is being drained.

13. A method as claimed in claim 12 wherein said draining of said at least one container comprises draining said pressurized fluid through a bottom drain port and said filling of said at least one container with air comprises injecting air into said at least one container at an inlet location above said bottom drain port.

14. A method as claimed in claim 11 wherein said at least one container consists of two containers and wherein said containers are raised and lowered along a straight vertical path.

15. The apparatus according to claim 5, wherein said air inlet port comprises:

a tube extending within said at least one container from said bottom side of said at least one container to a position substantially close to said top side of said at least one container for permitting air flow into said at least one container while said pressurized fluid is drained from said drainage port.

16. The apparatus claimed in claim 5 wherein said air inlet port includes an outlet located within said at least one container at a level above said drain port.

17. The apparatus claimed in claim 1 wherein said at least one container consists of two containers and wherein said containers are raised and lowered along a straight vertical path.

18. The apparatus according to claim 1, wherein said at least one container is sealed and said inlet port and said drainage port include valve means for sealing off said ports.

* * * * *